Patented July 23, 1935

2,008,691

UNITED STATES PATENT OFFICE 2,008,691

TREATMENT OF TEXTILE MATERIALS

George Holland Ellis, Spondon, near Derby, England, assignor to Celanese Corporation of America, a corporation of Delaware No Drawing. Application November 30, 1932, Serial No. 645,039. In Great Britain December 9, 1931

8 Claims. (Cl. 8—5)

This invention relates to the colouration of textile materials and in particular to the colouration of such materials as are made of or contain cellulose esters or ethers, or wool, silk or other animal fibres.

In U. S. Patent No. 1,844,350 and U. S. applications S. Nos. 287,646 filed 22nd June, 1928 and 636,944 filed 8th October, 1932 I have described the colouration of cellulose ester and ether materials by means of azo dyes produced thereon with the aid, as coupling components, of amides or substituted amides of hydroxy carboxylic acids of the benzene, naphthalene, carbazole or other series, or of β-keto acidyl compounds as exemplified for instance by diacetoacetyl tolidine, the said coupling components being applied in the free state. Particularly satisfactory results, both from the point of view of ease of manipulation and good fastness properties of the shades produced, may be obtained by applying both the diazo component and the coupling component to the material, either together or separately, from baths containing them in dispersed form, and thereafter subjecting the material to a treatment adapted to effect diazotization and coupling. The material impregnated with the diazo component may, however, be subjected to diazotization and thereafter treated with the coupling component in the free state as an aqueous dispersion, or the material may be treated with the coupling component, applied in the free state, and development effected with a diazo solution.

I have now found that in forming azo dyes on cellulose esters or ethers and also on other textiles, particularly animal fibres, azoic components employed in the free state, whether diazo or coupling components, may with very great advantage be fixed on the materials by applying them by mechanical impregnation and thereafter subjecting the materials to a steaming, ageing or other moist heat treatment. As the mechanical impregnation and the steaming or like treatment and even the diazotization and coupling process may be effected in a continuous manner, the new process enables the azoic colouration of the cellulose ester and ether and other materials to be effected continuously in a very convenient and expeditious manner. Thus, for instance, the continuous colouration of cellulose acetate woven fabric may be effected by padding the material with a preparation comprising both diazo and coupling component in dispersed state, passing the padded material through a steaming device to fix the components on or in the material, and thereafter passing it into a nitrous acid bath to effect diazotization and coupling. The necessity for a relatively prolonged manipulation of the material in a bath or baths containing the azo dye components may thus be avoided.

The new method of applying azo components may be utilized in any process involving the formation of azo dyes on the materials. Thus, for instance, a diazotizable base may be applied as an aqueous dispersion by mechanical impregnation and followed by steaming, and thereafter diazotized and developed in any convenient manner. Again, a material impregnated with a diazo component in any desired manner may be diazotized and the coupling component applied by the aforesaid mechanical impregnation and fixed by moist heat treatment. Further, a fabric may be impregnated with a coupling component by the new process and thereafter subjected to the action of an appropriate diazo solution. The invention is, however, of particular value in cases where the diazo component and coupling component are, either together or separately, first incorporated in the material and the latter then subjected to a treatment adapted to effect diazotization and coupling. Such a process is described in connection with arylamides of hydroxy naphthoic acids in U. S. Patent No. 1,844,350.

Again, the new process may be applied whatever the character of the diazo or coupling components. It has, however, been found of especial utility in connection with the employment as coupling components of arylamides of aromatic hydroxy carboxylic acids, for instance the arylamides of 2:3-hydroxy naphthoic acid, and also of β-keto acidyl derivatives of aromatic amines, as exemplified for instance by diaceto-acetyl ortho tolidine.

Mechanical impregnation with the free azo components, the latter being preferably in the form of aqueous suspensions or dispersions, may be effected in any desired manner. Thus, for instance, where uniform application is desired, a padding mangle may be employed, or the components may be applied by an all-over printing operation, for example by means of an engraved pad roller. Again, the components may be applied by spraying. Where it is desired to effect local application of the azo components, such application may be effected, for instance, by printing, stencilling or any other convenient means. The term "mechanical impregnation" includes any method wherein the components in question are applied to the material under treatment dissolved or dispersed in a quantity of liquid no greater than that which can be retained by the material.

A wide range of methods are available for applying the moist heat treatment utilized to fix or assist in the fixation of the azo components. For example, materials mechanically impregnated with the components may simply be rolled up in the moist state and maintained at a relatively high temperature, for example 40-70° C., until the components are sufficiently fixed. Again, the mechanically impregnated material may be passed through one of the steaming or ageing devices commonly employed in the textile industry where it is desired to subject fabrics to the action of moist heat.

The materials to which diazo or coupling components have been applied by the new process may subsequently be subjected to any desirable or necessary finishing or other treatment, for example a treatment adapted to effect or complete diazotization and/or coupling of the components on the material. Thus where following the treatment the materials contain both the diazo and the coupling component, they may be subjected to the action of a bath containing nitrous acid to effect diazotization and thereafter, if necessary, to the action of an alkaline bath to effect and/or complete the coupling operation.

If desired, instead of effecting diazotization by means of a nitrous acid bath, a nitrite may be applied to the materials in admixture with a diazo or coupling component, diazotization being then effected simply by an acid treatment.

The new process of fixing diazo or coupling components on textile materials may be utilized in a wide variety of ways for the production of a very extensive range of uniform or local colourations. The following paragraphs A-D illustrate some of the possibilities of the new process when both diazo and coupling components are fixed on the materials prior to the diazotizing and coupling operation:

A

Uniform shades may be produced by mechanically impregnating the materials with the amine and coupling component either together or separately, fixing the said components by steaming and thereafter developing in a nitrous acid bath. Where the components have been applied separately, steaming may, if desired, be applied following the application of each component.

B

Material may be printed with dispersions of diazo and coupling components and thereafter aged or steamed and developed in order to obtain local colourations. If a coloured ground is desired, the material may be first dyed with dyestuffs which will resist the diazotization process, or before or after printing, it may be padded or dyed with a preparation containing a diazo component and a coupling component in the dispersed state. In the latter case the fixation and/or development may take place before or at the same time as the fixation and/or development of the prints.

C

Material may be printed with dispersions of one or more diazotizable bases and thereafter padded all over with a dispersion of a suitable coupling component. The material may be then aged or steamed and developed with nitrous acid, whereby colourations are developed on the printed portions. As in B above, the effects may be produced on either white or coloured grounds. Alternatively, the coupling component may be applied first and after fixation by steaming or the like if desired the diazotizable bases applied locally by printing.

D

Materials may be mechanically impregnated with a diazotizable base and then, preferably after drying with or without steaming, over-printed with one or more dispersions of suitable coupling components. The material is thereafter aged or steamed and developed as before. Alternatively, the material may be first printed with the coupling component or components and thereafter uniformly mechanically impregnated with the diazotizable base.

It will be appreciated that in any of the above illustrative examples the operation of printing may be replaced by other modes of local application and that mixtures of coupling components or mixtures of diazo components may be employed for the purpose of producing mixed shades. Further, two or more different bases, or two or more different coupling components, may be printed side by side for the purpose of producing multi-colour effects. Again, discharge preparations may be printed side by side with or over the diazo or coupling component prints. Such discharge preparations may effect discharge of any dischargeable ground colouration and may also serve to render non-diazotizable any diazo component upon which they may fall. Reference in this connection may be made to U. S. application S. No. 391,692 filed 10th September, 1929.

Any desired diazo component may be employed in producing colourations by the new process, for example, any of the diazotizable bases mentioned in U. S. Patent No. 1,844,350 and U. S. applications S. Nos. 287,646 filed 22nd June, 1928, 636,944 filed 8th October, 1932 and 636,578 filed 6th October, 1932.

Likewise, a wide range of coupling components may be applied and fixed on textile materials by the new process. Such coupling components may be of amine, phenolic or other character, and as examples may be mentioned phenol and its homologues and substitution products, α- and β-naphthol, 1-oxy-naphthalene-4-aryl ketones, hydroxy naphtho carbazoles, pyrazolones, N-alkyl or aralkyl anilines or α- or β-naphthylamines and the coupling components referred to in U. S. Patent No. 1,844,350 and U. S. applications S. Nos. 287,-646 filed 22nd June, 1928, 636,944 filed 8th October, 1932 and 636,578 filed 6th October, 1932. Where the coupling and diazo components are both fixed on the material prior to diazotization and coupling, it is most desirable that the coupling component should not be prejudicially affected, as regards its power to couple, by the nitrous acid of the diazotizing bath. Where this method of working is to be utilized, therefore, care should be exercised in the choice of coupling component. Particularly suitable, however, are the acidyl acetic arylides and the arylamides of hydroxy aryl carboxylic acids referred to in U. S. Patent No. 1,844,350 and U. S. applications S. Nos. 287,646 filed 22nd June, 1928 and 636,944 filed 8th October, 1932.

Dispersions of diazo or coupling components in the free state, for use in accordance with the invention, may be produced by any desired means, for example by fine milling or grinding with or without the aid of dispersators and/or protective colloids, by precipitation in the presence of protective colloids, or by a simple treatment with dispersators, as described for instance in any of the prior U. S. Patents Nos. 1,618,413, 1,618,414, 1,694,413, 1,690,481, 1,716,721, 1,803,008 and 1,840,572 and U. S. applications S. Nos. 390,423 filed 4th September, 1929 and 390,424 filed 4th September, 1929. In some cases the dispersion of the coupling component may be facilitated by the presence of small quantities of alkali, for example a quantity of caustic soda sufficient to yield a preparation of about pH 7.2 or even slightly more alkaline.

As indicated previously the new process is particularly applicable to the colouration of materials containing cellulose acetate or other cellulose esters or ethers. As examples of such esters or ethers, reference may be made to cellulose formate, propionate or butyrate, or ethyl or benzyl cellulose. The process is, however, also applicable to the colouration of animal fibres, for example wool or natural silk. The new process may very advantageously be applied in the colouration in solid shades of mixed materials comprising both a cellulose ester or ether and an animal fibre. Cellulosic materials, for example cotton or regenerated cellulose, e. g. artificial silk produced by the viscose process, in general exhibit little or no affinity for diazo or coupling components when applied in the free state by the new process. In consequence, the latter enables valuable resist effects to be produced upon materials comprising both a cellulose ester or ether or an animal fibre and cotton or other cellulosic fibre. For example, by mechanically impregnating a cellulose acetate-cotton fabric with a mixture of a diazotizable base and a suitable coupling component in the free state, steaming and thereafter developing with nitrous acid and washing, the cellulose acetate alone is coloured, leaving the cotton substantially unaffected. In treating such mixed materials comprising cellulosic fibres they may, in many cases with advantage, be rinsed following the fixation of the azoic component or components and prior to the development in nitrous acid. In this manner, any tendency towards the superficial fixation of colour on the cellulosic component may be reduced.

The cellulosic component of a mixed material may, if desired, be coloured with suitable dyestuffs before, after or simultaneously with the colouration of the cellulose ester or ether or animal fibre component, and in the same or a different shade according to the effect required. Such colouration may, for instance, be effected with suitable vat dyestuffs applied in the manner described in U. S. Patent No. 1,716,720, in which case the shades on the two components may both be of very good fastness properties.

Though the invention is of especial value in connection with the colouration of textile fabrics, whether knitted or woven, it may, if desired, be utilized in the production of colourations on other forms of textile materials, for example yarn in hank or other form.

The following example illustrate the invention without being in any way limitative:—

Example 1

A cellulose acetate woven fabric is padded with a dispersion containing:—

|  | Parts |
|---|---|
| Para-amino-benzene-azo-α-naphthylamine (20% paste) | 10 |
| Methylated spirits | 10 |
| Gum thickening | 80 |
|  | 100 | the paddling mangle being adjusted so that the fabric retains approximately its own weight of solution. The fabric is dried, passed through a continuous steamer for 20 minutes, and then washed off and the amine diazotized in a bath containing 6 grams per litre of sodium nitrite and 15 ccs. per litre of hydrochloric acid of 28° Tw. After rinsing, development is effected by working in a bath in the cold for ½ hour containing 3% of dispersed β-oxy-naphthoic acid, calculated on the weight of the fabric, the dispersion being obtained by dissolving the β-oxy-naphthoic acid in water containing the theoretical quantity of caustic soda and glue or other acid resistant protective colloid, and then acidifying to a pH value of 5. The temperature of the development bath is then raised slowly and maintained at 75° C. for half an hour. The fabric is then soaped at 75° C. with 1½ grams per litre of a good textile soap, and rinsed, dried or otherwise treated as desired. In this manner a fabric is obtained dyed in a fast black shade.

Example 2

A woven fabric having a cellulose acetate warp and a viscose weft is padded with a thickened dispersion containing 1% of amino-azo-benzene and allowed to retain its own weight of liquor. It is then steamed and rinsed in warm water in order to clear the viscose. The fabric is then worked in an acidified nitrite bath to effect diazotization of the amino-azo-benzene, and coupled with resorcinol in the normal manner. The cellulose acetate portion of the fabric is thus dyed a full bright orange shade, the viscose weft being substantially uncoloured. To obtain further effects the material may be dyed in a fresh bath containing a direct cotton dyestuff. A two-colour effect is obtained, the cellulose acetate portion of the material having no affinity for the direct cotton dyestuff.

Example 3

2 parts of the anilide of 2:3-oxy-naphthoic acid are dissolved in 20 parts of water containing 1 part of Turkey red oil and ½ part of caustic soda and mixed with 1 part of 5-nitro-2-aminotoluene dissolved in 10 parts of methylated spirits. The whole is then mixed with 10 parts of water and 1 part of glucose made up to 100 parts with a suitable gum thickening. A cellulose acetate woven fabric is padded with this liquor, the padding mangle being adjusted so that the fabric retains approximately its own weight of padding liquor, and is then dried, steamed and washed off. The colour is developed by working for ½ hour in a diazotizing bath containing 4 grams of sodium nitrite and 8 ccs. of glacial acetic acid per litre, and the fabric then washed off and soaped at 75° C. when a full bluish red shade is obtained.

Example 4

Pastes are made up as in Example 3 but the 5-nitro-2-amino-toluene is replaced by 1 part of 2:5-dichloraniline and the oxy-naphthoic-anilide by 2 parts of diaceto-acetyl-o-tolidide, 2:5-dimethoxyanilide of 2:3-oxy-naphthoic acid, and the anilide of 2-oxy-carbazole-3-carboxylic acid respectively. The above pastes are applied to a cellulose acetate fabric by stencilling and the fabric then steamed and the designs developed as in Example 3 when yellow, orange and blue designs are obtained.

Example 5

A cellulose acetate fabric is printed with a paste containing:—

| | Parts by weight |
|---|---|
| Dyestuff 2-methoxy-benzene azo-α-naphthylamine (10% paste) | 10 |
| Alcohol | 10 |
| Suitable gum thickening | 80 |
| | 100 | and is then padded by means of engraved rollers with a thickened paste containing 2% of the anilide of 2:3-oxynaphthoic acid, 0.33% caustic soda and 2% glucose. The fabric is then steamed, diazotized and soaped as in Example 3 when fast navy blue shades are obtained on substantially white grounds.

Example 6

A paste made up by dissolving ½ part of 4-amino-4'-methoxydiphenylamine in 10 parts of methylated spirits adding 1 part of the o-toluidide of 2:3-oxy-naphthoic acid dissolved in 20 parts of water containing ¼ part of caustic soda and mixing with 10 parts of water containing ½ part of glucose and making up to 100 parts with a suitable gum thickening is printed on a cellulose acetate woven fabric dyed with ½% of benzene-azo-benzene-azo-phenol. The fabric is then dried, steam and washed off, and the colour developed by diazotization and soaping as in Example 3. A deep green pattern is obtained on a yellow ground, the green being the additive effect of the yellow ground and the blue azoic colouration.

Example 7

2 parts of the anilide of 2:3-oxy-naphthoic acid are dissolved in 20 parts of water containing ½ part caustic soda and added to 1 part of 5-nitro-2-amino-anisole dissolved in 10 parts of methylated spirits. The whole is then mixed with 10 parts of water containing 1 part of glucose, and made up to 100 parts with a suitable thickener. A woven fabric consisting of natural silk is padded with the above composition and squeezed out till it retains approximately its own weight of impregnating liquor. It is then dried and steamed for a quarter of an hour, washed and diazotized by treatment for 5 minutes in a bath containing 2 grams per litre sodium nitrite and 5 ccs. per litre glacial acetic acid. The fabric is then thoroughly washed off, soaped for 1 hour at 20 to 90° C., and finally rinsed and dried or otherwise treated as desired.

What I claim and desire to secure by Letters Patent is:—

1. In a process for the production of azo coloring matters on textile materials wherein a component is fixed in the free state on the material prior to color formation, the steps of effecting such fixation by applying to the material by mechanical impregnation an aqueous dispersion of the said component and subjecting the material to a moist heat treatment.

2. In a process for the production of azo coloring matters on fabrics wherein a component is fixed in the free state on the material prior to color formation, the steps of effecting such fixation by applying to the material by mechanical impregnation an aqueous dispersion of the said component and then steaming.

3. In a process for the production of azo coloring matters on fabrics wherein a component is fixed in the free state on the material prior to color formation, the steps of effecting such fixation by padding the material with an aqueous dispersion of the said component and then steaming.

4. In a process for the production of azo coloring matters on a fabric comprising an organic derivative of cellulose wherein a component is fixed in the free state on the cellulose derivative filaments prior to color formation, the steps of effecting such fixation by applying to the material by mechanical impregnation an aqueous dispersion of said component and subjecting the material to a moist heat treatment.

5. In a process for the production of azo coloring matters on a fabric comprising an organic derivative of cellulose wherein a component is fixed in the free state on the cellulose derivative filaments prior to color formation, the steps of effecting such fixation by applying to the material by mechanical impregnation an aqueous dispersion of said component and then steaming.

6. In a process for the production of azo coloring matters on a fabric comprising cellulose acetate wherein a component is fixed in the free state on the cellulose acetate filaments prior to color formation, the steps of effecting such fixation by applying to the material by mechanical impregnation an aqueous dispersion of said component and subjecting the material to a moist heat treatment.

7. In a process for the production of azo coloring matters on a fabric comprising cellulose acetate wherein a component is fixed in the free state on the cellulose acetate filaments prior to color formation, the steps of effecting such fixation by applying to the material by mechanical impregnation an aqueous dispersion of said component and then steaming.

8. In a process for the production of azo coloring matters on a fabric comprising cellulose acetate wherein a component is fixed in the free state on the cellulose acetate filaments prior to color formation, the steps of effecting such fixation by padding the material with an aqueous dispersion of said component and then steaming.

GEORGE HOLLAND ELLIS.

CERTIFICATE OF CORRECTION.

Patent No. 2,008,691.             July 23, 1935.

GEORGE HOLLAND ELLIS.

It is hereby certified that error appears in the printed specification of the above numbered patent requiring correction as follows: Page 4, first column, line 67, for "20" read 80; and that the said Letters Patent should be read with this correction therein that the same may conform to the record of the case in the Patent Office.

Signed and sealed this 20th day of August, A. D. 1935.

Leslie Frazer (Seal)                      Acting Commissioner of Patents.